United States Patent [19]

Johnson

[11] 4,173,304

[45] * Nov. 6, 1979

[54] BUILDING STRUCTURE WITH HEAT STORAGE AND RECOVERY

[76] Inventor: Arthur F. Johnson, 240 Fox Dr., Boulder, Colo. 80303

[*] Notice: The portion of the term of this patent subsequent to Oct. 18, 1994, has been disclaimed.

[21] Appl. No.: 842,320

[22] Filed: Oct. 14, 1977

Related U.S. Application Data

[63] Continuation-in-part of Ser. No. 742,798, Nov. 18, 1976, Pat. No. 4,054,246, which is a continuation of Ser. No. 551,075, Feb. 20, 1975, abandoned.

[51] Int. Cl.² .................................................. F24J 3/02
[52] U.S. Cl. ...................................... 237/1 A; 126/400
[58] Field of Search ...................... 126/400; 237/1 A; 165/45

[56] References Cited

U.S. PATENT DOCUMENTS

| | | | |
|---|---|---|---|
| 3,424,232 | 1/1969 | Garrett | 165/45 |
| 4,006,856 | 2/1977 | Nilsson | 237/1 A |
| 4,010,731 | 3/1977 | Harrison | 126/271 |
| 4,024,910 | 5/1977 | Werner | 165/45 |
| 4,051,891 | 10/1977 | Harrison | 126/400 X |
| 4,051,999 | 10/1977 | Granger et al. | 126/400 X |
| 4,054,246 | 10/1977 | Johnson | 126/270 X |
| 4,081,024 | 3/1978 | Rush et al. | 126/400 X |

Primary Examiner—William F. O'Dea
Assistant Examiner—William E. Tapolcai, Jr.
Attorney, Agent, or Firm—James J. Burke

[57] ABSTRACT

In my U.S. Pat. No. 4,054,246, a double-walled structure collects solar heat with air as the heat transfer medium, which heat is stored in subterranean gravel pits. In the present invention, (1) the design of the gravel pits is improved, (2) the efficiency of the solar collectors is improved, whereby needed collection area is reduced, (3) seepage into the pits is minimized, and (4) novel modes of operation using ambient air are disclosed.

14 Claims, 3 Drawing Figures

BUILDING STRUCTURE WITH HEAT STORAGE AND RECOVERY

RELATED APPLICATIONS

This application is a continuation-in-part of U.S. application Ser. No. 742,798 filed Nov. 18, 1976, now U.S. Pat. No. 4,054,246, issued Oct. 18, 1977, which was a continuation of application Ser. No. 551,075 filed Feb. 29, 1975, now abandoned.

BACKGROUND OF THE INVENTION

In my recent patent as noted above, there is disclosed a building structure including and outer walls with air passages therebetween, sized gravel both in subterranean pits and in a layer beneath the floor of the structure, and fans and ducts for circulating the air through the wall passages to collect solar heat, through the gravel to store or recover heat, and through the interior of the building to heat or cool same.

The storage of heat in rocks in solar energy systems is known per se, though rock is more commonly used as an insulator around a tank where a fluid heat transfer medium (e.g., water or glycol) is stored.

Recent substantial development of solar energy systems, spurred by tax benefits and grant programs, has concentrated on domestic hot water heating. The heat transfer fluid must be a glycol, silicone or other antifreeze type solution, and the danger always exists (e.g., of a leak) that will result in contamination of the water supply or, in systems where the water is held at a higher pressure than the fluid, dilution of the fluid. Such systems are also subject to catastrophic failure during a day-time summer power failure, since temperatures in the solar collectors will quickly rise to over 200° F. in the absence of circulation of the fluid. In contrast to the foregoing, the emphasis in my patent and in the present invention is on space heating, with air as both the heat transfer fluid and the heating medium. While the heat capacity of ambient air is of course much less than other fluids, it is free, it is non-contaminating and, most surprisingly, in accordance with the present invention as described hereinbelow, the energy costs in pumping air are very small in comparison with the value of heat saved.

OBJECT OF THE INVENTION

A general object of the present invention is to provide an improved building structure including heat storage and recovery means.

A more specific object of the invention is to provide improved solar heat collectors with air as the heat transfer fluid.

Another object of the invention is to provide improved subterranean heat storage means in the form of buried, gravel-filled trenches wherein the earth itself acts as a heat storage medium.

A further object of the invention is the provision of control means adapted to compensate for sudden weather changes utilizing stored thermal values and/or ambient air, thus avoiding resort to back-up or auxiliary oil or gas fired systems.

Yet another object of the invention is the prevention of thermal losses to groundwater seepage in subterranean heat storage facilities.

Various other objects and advantages of the invention will become clear from the following description of embodiments, and the novel features will be particularly pointed out in connection with the appended claims.

THE DRAWINGS

Reference will hereinafter be made to the accompanying drawings, wherein.

DESCRIPTION OF EMBODIMENTS

Figure 1:
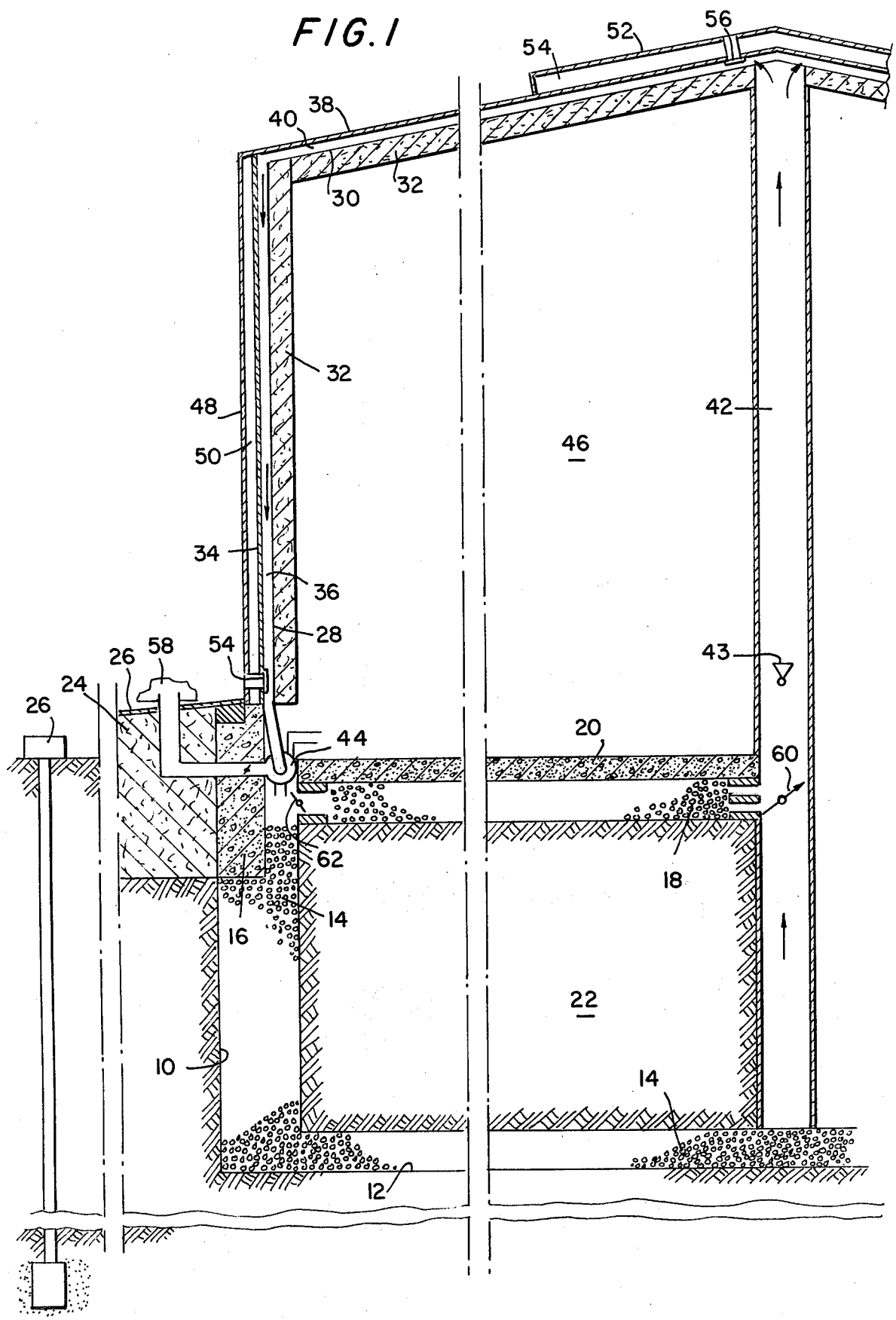
FIG. 1 is a cross-sectional elevation view, substantially simplified, of a building structure employing the invention.

The present invention is based, in one aspect, on the discovery that by providing what might appear to be a very large excess of heat storage capacity, total reliance may be placed on the system, and the need for back-up or auxiliary heating means is thus eliminated.

The heat storage capacity preferably is installed prior to construction of the building. More particularly, and with reference to FIG. 1, trenches 10 are first dug outlining the periphery of the building. These are 10–15 feet deep and approximately 2 feet wide, but of course sizes and depths can be varied. Next, a plurality of parallel cross trenches 12 are dug between trenches 10. Cross trenches 12 are also about 2 feet wide, and are spaced from 10 to 50 feet apart depending on total building size and desired heat capacity. Trenches 10 are then completely filled with sized gravel 14, and cross trenches 12 are filled to a depth of about 2 feet. Cross-trenches 12 are then back-filled back to grade. The size of the gravel is important, insomuch as this determines pore or void space and consequent pumping load. For best results, I prefer a minimum gravel size of 1.5 inches, and a size range of 1.5 to 3 inches.

Foundations 16 are then poured on top of gravel 14 around the building periphery and an additional foot to 2 feet of gravel 18 is provided under the entire floor area of the building. Floor 20 is then poured over gravel 18 (as noted in my earlier patent, it is desireable to "top" gravel 18 with finer gravel and sand).

It is to be noted that some trenching is required on conventional buildings and, with modern trenching machines the additional cost of the substructure described above is not great. Heat may be stored around the periphery of the building, directly beneath the floor, and ten feet or more below grade. When temperature gradients are considered, it becomes apparent that the earth 22 below gravel 18 and above buried trenches 12 will also act as a heat storage medium. In practice, the earth 22 and earth surrounding the structure is heated as well, increasing total heat capacity.

An advantage of the invention is that the heat flow in earth is very slow, providing the earth is dry. If there is substantial seepage of ground water or soaking in of rain water, the heat conductivity of the earth block, below the building will be increased to the point where storage of heat is difficult or impossible. To avoid this, a peripheral area 24 around the building is paved or otherwise treated so as to be impervious to moisture. Rain water collected on the roof is also conducted away from the building by suitable drains (not shown), and, deep well pumps 26 are provided if necessary to keep the water table lower than earth block 22. While one would obviously prefer not to site the structure over underground water courses, the flow of such streams may be deflected by pumping concrete mixed with an expanding fiber such as sawdust via drillholes. Obviously, ground water conditions will be a significant factor in determination of the depth of trenches 10, 12.

Solar energy collection is improved if, at least on the south and west sides of the building, paved area 24 is provided with a reflective surface 26.

The building per se is similar to that disclosed in my earlier noted patent in many respects. More particularly, side walls 28 and roof 30 have a suitable layer of thermal insulation 32 on the interior surface. Outer side walls 34, which may be corrugated metal with a radiation-absorbent outer surface, are spaced from side walls 28 to provide air passages 36 therebetween. Similarly, roof covering 38 is spaced from roof 30 to provide air passages 40. Air ducts 42 and fans 44 are provided to conduct air to and from passages 36, 40, to and from storage means 14, 18, to and from the outside, and to and from the building interior space 46. Operation of the system is described hereinbelow. It should be appreciated that the walls and roof are supported by structural members (not shown). Further, an additional metal inner wall may be provided to replace (or supplement) ducts 42, most particularly so that air from trenches 14 or layer 18 (at 50°-60° F., generally) can be used to warm the north-facing sides of the building, and minimize heat loss, before being reheated in the solar collectors.

In my earlier patent, solar energy was absorbed directly on the building exterior and transferred directly through walls 34 and roof 38 to the circulating air. Because of the very large collection area (substantially all sun-oriented surfaces), the relatively low efficiency of such heat transfer could be tolerated. This ignores the so-called "greenhouse effect" which other types of solar collectors take advantage of, and I have now determined that the benefits of this effect outweigh the additional costs involved. More particularly, a transparent glass or plastic outer skin 48 is provided over the sun-oriented surfaces (south-facing), spaced from outer wall 34 and creating a dead-air space 50 therebetween about 0.5–1.5 inches wide. Solar radiation passes through skin 48 and impinges on wall 34, where substantial portions are converted to the infra-red region. Skin 48 is opaque to infra-red radiation, which is thus trapped. Heat absorption under such conditions is of course greatly enhanced. In FIG. 1, an additional collector of the same type is shown on the apex of the roof, glass or plastic covering 52 creating dead air space 54. It will be appreciated that in most climatic regions, collectors of the type described will provide more than sufficient thermal values and heat collection in passages 40 which do not underly a cover 52 is optional. This creates the possibility of using separate "add-on" collectors having air passages, rather than the integral structure disclosed in the drawing. In either event, however, certain precautions are required, due to the very high temperatures that can be generated in such collectors in the absence of constant transfer to the moving fluid, e.g., in the event of a power failure disabling fans 44. Firstly, walls 34, 38 must be able to withstand significant thermal expansion. Generally, corrugated materials and overlapping, rather than abutting, panels takes care of expansion problems. Secondly, temperature responsive valves 54, 56 should be provided at ground and roof levels so that, in the event of a power failure, air will flow through passages 36, 40 by natural convection. Valves 54, 56 can be actuated by suitable bimetallic elements and thus be independent of any power source.

A further aspect of the invention is to keep close temperature control within the structure despite sudden variations in weather. For Example, during the winter months, a warm spell may decrease heat losses from the structure to the extent that the floor is uncomfortably warm. However, by blowing ambient air from inlet 58 through the gravel heat storage 18 immediately under the floor, floor temperature is reduced, and this heat can be wasted to the atmosphere. Such a method would not be practical if a gravel heat storage 18 under the slab of concrete floor was the only storage available, but with the enormous storage of heat in the earth 22 available and more particularly that added around the perimeter 10, 12 (not immediately under the floor) it becomes practical to adjust floor temperatures from time to time by blowing ambient air under the concrete slab. Cooler ambient air at night may be used and that heat wasted to the atmosphere.

Similarly in cold or sub zero weather when floor heat is insufficient the fans may heat the air inside the structure by circulating this air through the gravel under the floor and back into the inside of the structure. Cooling the gravel under the floor accelerates the flow of heat upwardly from earth storage.

Obviously, the invention can be employed in somehwat modified form to existing structures. For example, gravel-filled trenches can be installed adjacent to and around an existing structure, and layer 18 could be provided on top of an existing floor slab, with a new floor installed thereover. Alternatively caisson holes can be drilled around the periphery of the building, and ducts (pipes) provided to conduct air to the bottom of same for either heat storage or recovery As a further alternative, layer 18 can be installed between or as a replacement for floor-supporting joists in a wooden-floored structure.

A further improvement involves the use of a water mister 43 on the "cold" side of the system. As is well known, the heat capacity of air is dramatically increased by contained moisture. However, it is important to avoid condensation at any point in the system, particularly in the heat storage means. To this end mister 43 (or any suitable device) is located at a point of minimum temperature in the system, such as duct 42. Air saturated with water at this point becomes progressively less saturated at higher temperatures, heat capacity is increased but condensation is avoided.

In FIG. 1 it is to be noted superheating on both the southerly wall and apex of the roof would not normally be used together as shown. That is, when the air flow is as shown (upward into the roof apex) no apex superheating at 52 would be used, since the bare roof would be preheating the circulated air to receive superheat at 48 as it passed downwardly through the air passage 36 behind the southerly facing metal wall 34. Similarly, without greenhouse area 48 on the southerly (or westerly) facing metal wall air would be blown upward through passage 36 and horizontally through air passage 40 to be preheated before passing under greenhouse area 52 to be superheated, before moving down through duct 42 to heat storage in gravel.

Thus, in accordance with the invention, fans may be reversed to obtain the different air flows, adding beneficial flexibility in both heating and cooling.

Figure 2:
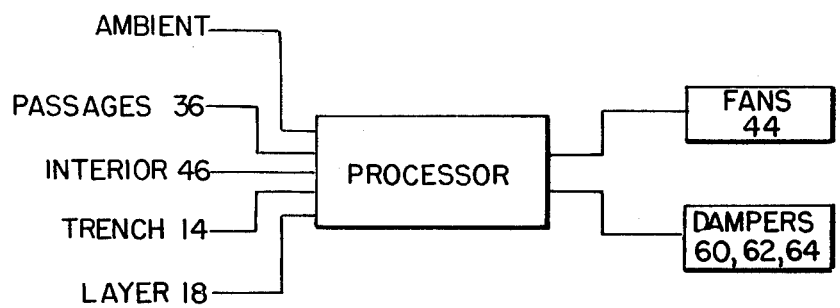
FIG. 2 is a simplified schematic diagram of a control system for the invention.
Figure 3:
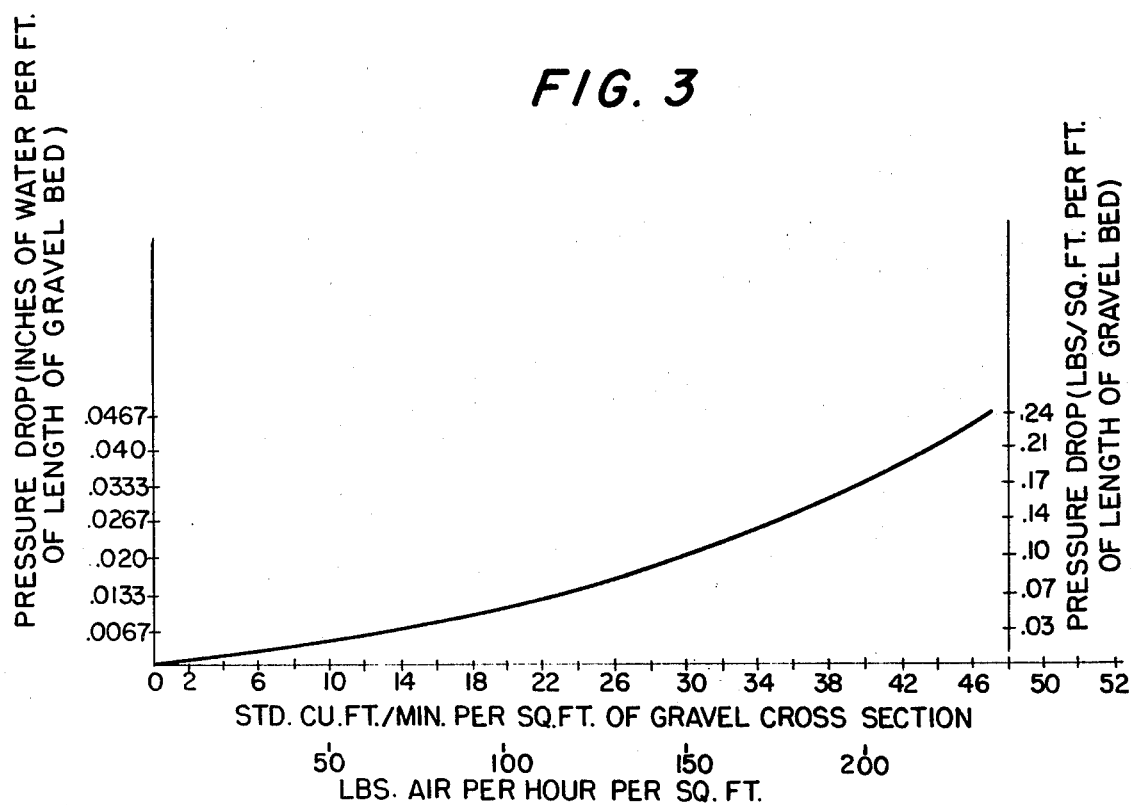
FIG. 3 is a chart showing pressure drop as a function of air volume in the heat storage means of the invention.

Operation of the system is preferably controlled by a microprocessor or minicomputer, in conjunction with fans 44, dampers 60, 62, 64, and temperature sensors: one for ambient air, and others located in passages 36, interior 46, trenches 14 and layer 18. This is illustrated in FIG. 2. With this system, by such calculations it is possible to approximate the length of gravel filled trench that will reduce solar heated air temperature of constant volume flow through the trench to temperatures approaching those of the gravel contained in the trench. To enable those wishing to practice the methods of this invention, Table I presents calculations to show how 120° F. air entering a 1 foot square cross section of trench of gravel at 50° F. at the rate of 18.1 cu. ft./min. (equivalent to 87.6 lbs air/hour/sq.ft trench cross-section) can exchange heat so as to reduce air temperature in 5 degree F. amounts in calculated lengths of trench until 65° F. is reached after 6 hours of time through segments of the trench totaling 37.34 feet in length. The calculated pressure necessary for a fan to cool this quantity of air in a trench of this length is only 0.3 inches of water, so the amount of electric power for the fan to store this heat is insignificant, and the example shows that the air cooled to 65° F. (or cooler by added length of trench) could be used after storing this heat to cool the concrete floor slab to practice the above outlined aspect of this invention. Those wishing to make calculations for other air temperatures, velocities, or humidities or other gravel temperatures, size or percent void's or particle densities need only alter the figures and recalculated Table I to suit conditions desired. FIG. 3 shows how pressure drop varies with rate of air travel through gravel. Mark's Handbook, 1941 Edition, page 1958-60 shows fan horsepower is equal to inches of water pressure multiplied by cu.ft. air/min. and the constant 0.0001575, static, divided by static efficiency. Air resistance to flow in the ½ to 2 inch spaces between structure covering and the insulation and inducts connecting with gravel-filled trenches are readily calculated by methods of ASHRAE Handbook of Fundamentals chapter 25. Table II shows a 40 year average of degrees below 65° F. in Denver area, and heat lost per year at U-factors of 0.1 and 0.05 of respectively 14,119 Btu/sq.ft. and 7,019 Btu/sq.ft. These values compared with the fact that 646,666 Btu/sq.ft of solar heat are received on a flat roof per year illustrate it is highly feasible and desireable to store heat peripheral to the structure and waste heat by cooling floors on warm days, since heat in great excess to that needed is available if only 10% of the solar heat received on a roof is recovered and stored.

Understanding of the invention will be facilitated by referring to the following examples, Tables I and II, and FIG. 3. Nomenclature and calculations are based in part on Löf et al., "*Unsteady-State Heat Transfer Between Air and Loose Solids*," Industrial & Engineering Chemistry, Vol. 40, No. 6, June 1948, pp. 1061-1070.

Tables I hereinbelow uses as an example a trench 37.34 feet long and of 1 square foot cross-section, through which 87.6 lb/hr of air is blown, which air is initially heated to 120° F. in the solar collectors.

Nomenclature c = heat capacity of unit volume of material of particles, Btu/cu.ft./°F.
c' = heat capacity of unit volume of gas at constant press, Btu/cu.ft.°F.
d = equivalent spherical diameter of particles, feet
f = fraction of voids in the bed
G = air rate, lbs/hour/sq.ft. superficial, based on cross section of empty bed
h = heat transfer coefficient, Btu/hour/°F./cubic foot
k = thermal conductivity of the particles, Btu/hour/sq.ft/°F./foot
$t_{g,o}$ = constant entering temp. of the fluid, °F.
$t_g$ = the fluid temp. at any point and time °F.
$t_{s,o}$ = initial constant solid temp. °F.
$t_s$ = solid temp. at any point and time °F.
$\theta$ = time after start heating, hours
v = average volumetric fluid rate through bed, cu.ft./hour/sq.ft. at total cross-section
X = distance from entering bed, feet
$Y = hx/c'V = hx \, p/c'G$
$Z = h \, \theta / c \, (1-f)$
p = density of fluid, lbs/cu.ft = 0.0807
u = viscosity of fluid, lbs/hour/foot Löf et al. determined that the heat transfer coefficient, h, for granitic gravel is $$h = 0.79(G/d)^{0.7}$$

which for the conditions stated works out to 85.16 Btu/hr/cu.ft.

Other conditions are as follows:
c = 41.3 btu/cu.ft.°F.
c' = 0.0191 Btu/Standard cu.ft/°F.
f = 0.39 voids; 1 − = 0.61 solid gravel (rock)
$\theta$ = 6 hrs time after start heating bed In Table I, Y, is a function of position in the bed. The value of Y is obtained by applying the temperature function (A/B) to the Schumann curves reprinted by Löf et al., for calculated values of Z, a function of time since start of operation. Distance (x) is then calculated (x = Yc'G/hp).

TABLE I

| $t_g$ | $t_{s,o}$ | (A) $t_g$-$t_{s,o}$ | $t_{g,o}$ | (B) $t_{g,o}$-$t_{s,o}$ | $t_g$-$t_{s,o}$/$t_{g,o}$-$t_{s,o}$ | Y | x = Y × 0.2435 |
|---|---|---|---|---|---|---|---|
| 115 | 50 | 65 | 120 | 70 | 0.9286 | 12.5 | 3.04 |
| 110 | 50 | 60 | 115 | 65 | 0.9231 | 12.6 | 3.07 |
| 105 | 50 | 55 | 110 | 60 | 0.9167 | 12.7 | 3.09 |
| 100 | 50 | 50 | 105 | 55 | 0.9091 | 12.8 | 3.11 |
| 95 | 50 | 45 | 100 | 50 | 0.9000 | 13 | 3.17 |
| 90 | 50 | 40 | 95 | 45 | 0.8889 | 13.4 | 3.26 |
| 85 | 50 | 35 | 90 | 40 | 0.8750 | 13.9 | 3.38 |
| 80 | 50 | 30 | 85 | 35 | 0.8571 | 14.5 | 3.53 |
| 75 | 50 | 25 | 80 | 30 | 0.8333 | 15 | 3.65 |
| 70 | 50 | 20 | 75 | 25 | 0.8000 | 16 | 3.90 |
| 65 | 50 | 15 | 70 | 20 | 0.7500 | 17 | 4.14 |
| | | | | | | | 37.34 linear and cubic feet |

To recapitulate, Table I shows that roughly 90 lb/hr of 120° F. air, when blown through a 37 foot trench of 1.5 inch gravel for 6 hrs will have a maximum exit temperature of 65° F. Obviously, earlier in the cycle the temperature will be even lower. In sum, a great deal of heat can be stored in this manner. The exit air can be recycled to the solar collectors or, during warm periods, used to cool either the floor 20 or interior 46 of the building.

TABLE II

Data and Calculations based on Denver U.S. Dept. Commerce Local Climatological Summary for 1933 to 1972 inclusive

| Ave. Mean Temp. | Difference 65° F.-Mean | Degree Days below 65° F. | Heat Lost in Btu/sq/ft per month = Degree Days × 0.1 U Factor × 24 hrs | a 0.05 U Factor |
|---|---|---|---|---|
| Jan. 30.2 | 34.8 | 31 × 34.8 = 1079 | 2590 | |
| Feb. 32.8 | 32.2 | 28 × 32.2 = 902 | 2165 | |
| Mar. 38.6 | 26.4 | 31 × 26.4 = 818 | 1963 | |
| Apr. 47.5 | 17.5 | 30 × 17.5 = 525 | 1260 | |
| May 56.7 | 8.3 | 31 × 8.3 = 257 | 617 | |
| June 66.6 | | 30 | | |
| July 72.6 | | 31 | | |
| Aug. 71.3 | | 31 | | |
| Sept. 62.7 | 2.3 | 30 × 2.3 = 69 | 166 | |
| Oct. 51.5 | 13.5 | 31 × 13.5 = 419 | 1006 | |
| Nov. 39.7 | 25.3 | 30 × 25.3 = 759 | 1918 | |
| Dec. 32.3 | 32.7 | 31 × 32.7 = 1014 | 2434 | |
| Total | | | 14,119 Btu/sq.ft. | 7,019 Btu/sq.ft. |

As may be seen from Table II, January is the month with the highest degree below 65° F., with 1079 compared to 1014 in December and 902 in Febraury (in 28 days). These winter months are the time when solar heating is conventionally insufficient to provide total needs for heating a structure. The present invention, through enormous and inexpensive heat storage in the earth, and new methods of collecting superheating and storing solar energy, make winter heating by solar energy alone entirely feasible and economic.

From Table II, in January the average mean temperature is 39.8 degrees below 70° F., and the heat loss through the roof with a 0.05 U-factor is 48 Btu/sq.ft./day or 2 Btu/sq.ft/hr. insulation values that are comparable are in the literature: Morrison and Farber: "Development and Use of Solar Insulation Data for South-Facing Surfaces in Northern Latitudes," particularly Table III, "Solar Position and Insulation Values for 40 degrees North Latitude." The average insulation on a south facing vertical wall in January at 40° north latitude is 1726 Btu/sq.ft/day, and on a horizontal roof it is 948, so if 3% or more of the solar heat on the roof or 5% of that on the south wall can be recovered and stored at temperatures above 70° F., the entire needs during the winter can be supplied from heat recovered and stored during the winter. In present conventional systems, sufficient heat storage is not provided to last during the times when solar heat is unavailable due to storms and subzero weather.

To illustrate how this invention can provide winter heat needs, the following example is presented, based on U.S. Department of Commerce Climatological Data for January 1970. By methods outlined in ASHRAE Handbook of Fundamentals for 1972, it was found that during the three hours of 11 AM to 2 PM of January 1970 a total of about 1170 Btu/sq.ft/hr was recoverable above 70° F. in a narrow (1") space between a dark colored, flat metal roof and 6 to 9 inches of fiberglass roof insulation. This recovery, averaged over the 744 hours in January, is 1.57 Btu/sq.ft/hr. Thus, even without any greenhouse-effect superheating, recoverable heat in just 3 hours compares closely with approximate 2 Btu/sq.ft/hr heat loss at a U-factor of 0.05.

To insure that there is an excess of solar heat available in each month of the winter, the southerly-facing vertical or outward-inclined wall of the structure is provided with enough area covered with glass or plastic to constitute about 10% of the roof area. In tis area in January, an average of 2580 Btu/sq.ft. of solar heat is gained per day. Of this, 30% is conservatively recoverable, or 32 Btu/sq.ft./hr. over 24 hours on the south wall, or 3.2 Btu/sq.ft./hr of roof (10 times larger). When this is added to the 1.57 Btu/sq.ft/hr recovered from the bare metal roof, the total is 4.8 Btu/sq.ft./hr. This is more than twice that needed to compensate for losses at a U-factor of 0.05. By drawing the air heated beneath the bare metal roof downward beneath plastic or glass-covered south wall, it is superheated by 100° or more before it is carried down into heat storage in the trenches, where it maintains the necessary heat gradient and heat flow into the floor and building perimeter.

By superheating the air, heat carrying capacity of the circulating air and the heat storage capacity of a cubic foot of gravel is increased by 100 times or more, and capital costs of fans heat storage are decreased proportionately. The heat gradient in earth storage beneath the floor is proportional to the heat gradient through the heat insulation beneath the roof. With 9 inches of roof insulation (to insure an overall U-factor of 0.05 per unit of floor area) and an average 40 degree temperature difference between the inside and outside in January, the gradient will be 4.4°/in. thickness of insulation. Since earth material such as sand has a heat conductivity in the order of 10 times that of fiberglass, the heat gradient need only be 0.44°/in. per inch of depth, or 5°/ft., or 120° F. 10 feet below the floor. With a 0.1 U-factor it would need to be 170° F.

Heat stored at a depth of 10 feet in gravel weighing 100 lbs/cu/ft and having a specific heat of 0.2 and at an average temperature 25° F. above the room temperature would be about 5000 Btu/cu.ft. If all this heat was recovered it would keep the structure heated for 100 winter days without any heat being added. With heat stored in earth peripheral to the storage means beneath the building, heat storage may be doubled. More particularly, the data used in Table I may be applied to FIG. 1 in a building 100 ft. wide by 200 ft. long, with layer 18 being 1 ft. thick. Thus, layer 18 has 20,000 cu.ft. storage. Blowing air heated to 200° F. for 6 hrs. a day 100 days in the late summer and fall at the rate of 87.6 lbs/hr. (equal to 18.1 cu.ft/min. per sq.ft of layer 18) through 1.5 inch diameter gravel will require a fan of about 3 horespower against an estimated 1 inch static head, and consume about 1343 kilowatt hours per hundred million Btu stored (5,000 Btu/sq.ft. of structure floor). This is the estimated requirement if no solar heat is recovered during the three winter months. Electricity at 2.5c/kwh would cost $33.60 for the 100 million Btu. stored. If natural gas were used, selling for $2.12/million Btu., divided by 75% heating efficiency or $2.82 per million Btu available, it would cost $282 for 100 million Btu. required for the 20,000 sq./ft. building insulated to 0.05 U-factor. Fans or blowers would also be needed during the winter months, to recover heat from the trenches during days so cold that heat in the floor alone was insufficient, but the electricity cost for this would not be greater than for fans needed for natural gas heaters, and capital cost of fans and control costs would be similar.

Various changes in the details, steps, materials and arrangements of parts, which have been herein described and illustrated to explain the nature of the invention may be made by those skilled in the art within the principle and scope of the invention as defined in the appended claims. For example, gravel that is to be load-bearing is advantageously compacted initially, to avoid later settling problems. This does not materially reduce pore space. Further, gravel that will heat (or cool) air to be circulated within the building should be thoroughly washed to avoid dust problems and/or the eneed for a filter. Also, heat losses away from the structure (outwardly and downwardly) can be minimized by use of surrounding and underlying dry sand, which is a good insulator.

What is claimed is:

1. Heat storage means for a building structure comprising:
    peripheral trenches beneath the perimeter of said building filled with gravel, said gravel supporting the building foundations;
    a plurality of spaced parallel buried trenches extending between opposed peripheral trenches at the bottom thereof and also filled with gravel;
    a layer of gravel underlying the floor of said structure;
    all of said gravel being sized to have a minimum diameter of about 1.5 inches; and
    means for blowing air through said gravel for storage and retrieval of heat.

2. The heat storage means as claimed in claim 1, wherein said gravel has a size range of 1.5 to 3 inches.

3. The heat storage means as claimed in claim 1, wherein said peripheral trenches are from 10 to 15 feet deep.

4. The heat storage means as claimed in claim 1, wherein said blowing means comprise fans, dampers and ducts, whereby air may be selectively blown through said peripheral and buried trenches or said gravel layer.

5. The heat storage means as claimed in claim 1 and additionally comprising means adapted to prevent groundwaters from contacting said heat storage means.

6. The heat storage means as claimed in claim 5, wherein said groundwater prevention means comprise rainwater deflectors and deep-well pumps.

7. A building structure including solar energy collection and storage means comprising:
    wall and roof elements including solar energy collectors having air passages whereby air may be used as a heat transfer medium;
    heat storage means beneath said structure comprising:
        peripheral trenches beneath the perimeter of said building filled with gravel, said gravel supporting the building foundations;
        a plurality of spaced parallel buried trenches extending between opposed peripheral trenches at the bottom thereof and also filled with gravel;
        a layer of gravel underlying the floor of said structure;
        all of said gravel being sized to have a minimum diameter of about 1.5 inches; and
    means for blowing air through said passages for heat collection, blowing heated or ambient air through said gravel for heat storage or retrieval, and blowing heated air through the interior of said building.

8. The building structure as claimed in claim 7, wherein said gravel has a size range of 1.5 to 3 inches.

9. The building structure as claimed in claim 7, wherein said peripheral trenches are from 10 to 15 feet deep.

10. The building structure as claimed in claim 7, wherein said blowing means comprise fans, dampers and ducts, whereby air may be selectively blown through said peripheral and buried trenches or said gravel layer.

11. The building structure as claimed in claim 7 and additionally comprising means adapted to prevent groundwaters from contacting said heat storage means.

12. The building structure as claimed in claim 11, wherein said groundwater prevention means comprise rainwater deflectors and deep-well pumps.

13. The building structure as claimed in claim 7, wherein said solar energy collectors comprise:
    air preheating passages beneath radiation-absorbent wall or roof sections; and
    air superheating passages beneath radiation-trapping wall or roof sections.

14. The building structure as claimed in claim 10, and additionally comprising means for saturating cool air prior to blowing same through said passages for heat collection.

* * * * *